United States Patent
Emelyanov et al.

(10) Patent No.: US 11,741,235 B1
(45) Date of Patent: *Aug. 29, 2023

(54) SYSTEM AND METHOD FOR PROVIDING DISTRIBUTED COMPUTE PLATFORM ON UNTRUSTED HARDWARE BASED ON ENCRYPTION

(71) Applicant: Virtuozzo International GmbH, Schaffhausen (CH)

(72) Inventors: Pavel Emelyanov, Moscow (RU); Alexander G. Tormasov, Moscow (RU); Alexey Kobets, Seattle, WA (US)

(73) Assignee: Virtuozzo International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/467,832

(22) Filed: Sep. 7, 2021

Related U.S. Application Data (63) Continuation of application No. 15/854,402, filed on Dec. 26, 2017, now Pat. No. 11,113,400.

(51) Int. Cl.
| | |
|---|---|
| *G06F 21/57* | (2013.01) |
| *G06F 21/44* | (2013.01) |
| *H04L 9/32* | (2006.01) |
| *G06F 9/455* | (2018.01) |
| *H04L 9/00* | (2022.01) |

(52) U.S. Cl.
CPC ........ *G06F 21/575* (2013.01); *G06F 9/45558* (2013.01); *G06F 21/44* (2013.01); *H04L 9/008* (2013.01); *H04L 9/3247* (2013.01); *G06F 2009/45587* (2013.01); *H04L 2209/56* (2013.01)

(58) Field of Classification Search
CPC .... G06F 21/575; G06F 21/44; G06F 9/45558; G06F 2009/45587; H04L 9/008; H04L 9/3247; H04L 2209/56
See application file for complete search history.

(56) References Cited

U.S. PATENT DOCUMENTS

| | | | | |
|---|---|---|---|---|
| 8,918,488 | B2 * | 12/2014 | Umbehocker | H04L 69/18 709/215 |
| 9,009,704 | B2 * | 4/2015 | McGrath | G06F 9/455 718/1 |
| 9,983,894 | B2 * | 5/2018 | Horovitz | G06F 9/45545 |
| 10,061,915 | B1 * | 8/2018 | Roth | G06F 21/50 |

(Continued)

*Primary Examiner* — Saleh Najjar
*Assistant Examiner* — Devin E Almeida
(74) *Attorney, Agent, or Firm* — ArentFox Schiff LLP; Michael Fainberg

(57) ABSTRACT

A system and method is provided for providing distributed computing platform on untrusted hardware. An exemplary method includes launching a hypervisor on an untrusted computing node and receiving a request generated to provide a computing function using hardware of the untrusted computing node. Upon receiving the request, an enclave in memory of the untrusted computing node is created and a virtual machine is launched in the memory enclave. Moreover, a guest operating system of the virtual machine verifies the security of the untrusted computing node. Finally, the guest operating system performs the computing function using the hardware of the untrusted computing node upon the guest operating system verifying the security of the untrusted computing node and the hypervisor.

23 Claims, 9 Drawing Sheets

(56) References Cited

U.S. PATENT DOCUMENTS

| | | | |
|---|---|---|---|
| 2015/0242197 A1* | 8/2015 | Alfonso | G06F 8/65 717/173 |
| 2015/0286582 A1* | 10/2015 | Scott-Nash | G06F 9/44505 726/2 |
| 2015/0319160 A1* | 11/2015 | Ferguson | G06F 21/6209 726/10 |
| 2016/0055016 A1* | 2/2016 | Beveridge | G06F 9/4451 718/1 |
| 2016/0147550 A1* | 5/2016 | McWilliams | G06F 9/45558 718/1 |
| 2016/0149999 A1* | 5/2016 | McGrath | G06F 16/2329 709/217 |
| 2016/0330138 A1* | 11/2016 | Thomason | H04L 67/10 |
| 2016/0378535 A1* | 12/2016 | Oh | G06F 9/4451 718/1 |
| 2017/0054557 A1* | 2/2017 | Rozas | H04L 63/10 |
| 2018/0060572 A1* | 3/2018 | Singleton | G06F 21/53 |
| 2018/0095894 A1* | 4/2018 | Leslie-Hurd | G06F 3/064 |
| 2018/0203801 A1* | 7/2018 | Leslie-Hurd | G06F 9/45558 |
| 2019/0102211 A1* | 4/2019 | Root | G06F 21/31 |

\* cited by examiner

SYSTEM AND METHOD FOR PROVIDING DISTRIBUTED COMPUTE PLATFORM ON UNTRUSTED HARDWARE BASED ON ENCRYPTION

CROSS-REFERENCE TO RELATED APPLICATIONS

This application is a continuation of U.S. Non-Provisional application Ser. No. 15/854,402 filed Dec. 26, 2017, which is herein incorporated by reference.

TECHNICAL FIELD

The present disclosure relates generally to the field of distributed computing services, and, more specifically, to a system and method for providing distributed compute functions on untrusted hardware.

BACKGROUND

Recently, cloud computing services have become increasingly popular as they enable easy and seamless access to shared pools of configurable resources, such as computer networks, servers, data storage, applications and services. Moreover, these resources within a cloud environment can be rapidly provided to client devices with minimal management effort and usually over the Internet. Cloud computing services allow user client devices and enterprises with various computing capabilities to store and process data either in a privately-owned cloud, or on a third-party server located in a data center, for example, making data-accessing mechanisms more efficient and reliable.

Figure 1:
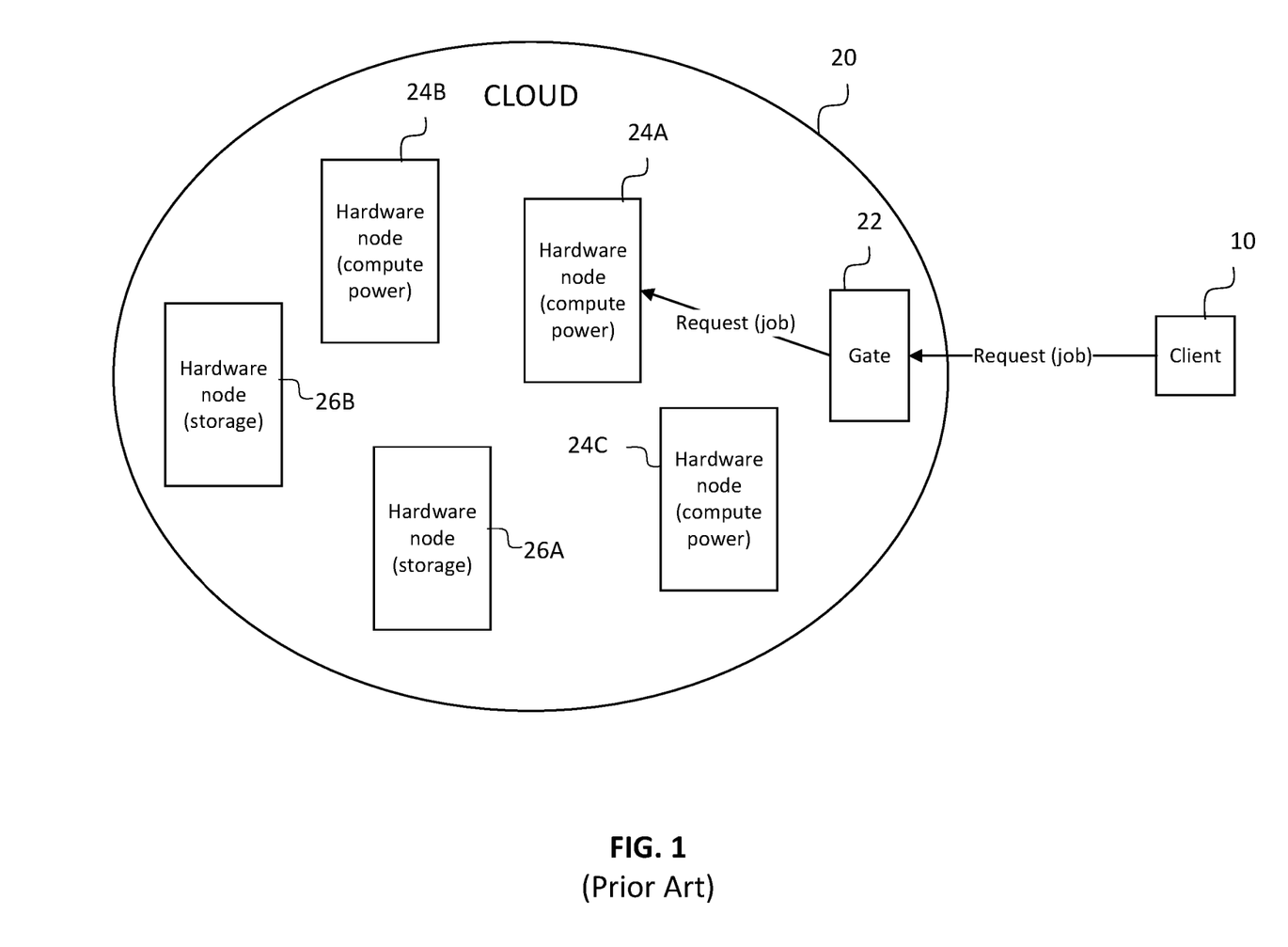
FIG. 1 illustrates a block diagram of a conventional cloud computing environment for providing hardware resources to a client device.

FIG. 1 illustrates a block diagram of a conventional cloud computing environment for providing hardware resources to individual users of client devices. As shown, the traditional cloud computing system 20 can include a plurality of individual hardware nodes 24A-24C and 26A-26B, which can belong to hosting providers and can provide compute power (i.e., nodes 24A-24C) and remote storage (i.e., nodes 26A-26B), for example. Moreover, such cloud computing system 20 can typically include a gate 22 or ("broker"). Accordingly, when a client device 10 sends a request(s) to the cloud to perform a job (e.g., a data computations, data storage, or the like, the gate 22 will first receive the request from the client device 10 and determine which hardware node from the plurality of available hardware nodes 24A-24C and 26A-26B should handle the requested job. Upon making this determination, the gate 22 will then assign the job to the identified node (e.g., shown as hardware node 24A according to the example). When the job is performed and completed by the assigned hardware node 24A, the gate 22 will then obtain the result from the assigned hardware node 24A and return the result back to the requesting client device 10.

As shown in FIG. 1, for example, in many such cloud computing environments, the hardware nodes can be a part of a known and trusted cloud system. As a result, the individual hardware nodes will not require separate verification of trust before that node is assigned to perform a particular job. However, there can also be cloud environments where jobs are outsourced to other client devices (e.g., hardware lords or hardware providers) that offer their hardware capabilities, but that are not known to be trusted and secure. In other words, one or more jobs sent by client device 10 can be performed on separate hardware provided by another client device of a second type (e.g., hardware providers) outside the trusted cloud computing system 20.

In such instances, cloud computing system 20 can effectively act as the broker to enable end users to lend their computers (e.g., the hardware functionality) to a requesting client device to perform a requested job. Moreover, this type of hardware hosting can be implemented in stages. For example, the hardware provider can lend itself as a regular KVM ("Kernel-based Virtual Machine") and/or lend part of its hardware (e.g., projects such as Hydra from Huawei, Jailhouse from Siemens, etc.) to perform the requested job. However, it is also critical that the requesting client and hosting client should be protected from each other for security purposes (computing function of requesting client should neither affect nor be affected (or viewed) by any program on the hosting client device).

Thus, in a cloud environment, the requesting client device will assuredly expect that the cloud computing system (i.e., the broker) will provide high availability and trust for the requested job when it is performed by these remotely located hardware nodes. However, in existing cloud computing environments working with hosting clients, the gate 22 or broker typically cannot provide high availability and trust.

High availability can more easily be achieved as the gate 22 should typically only assign hardware providers that can perform certain types of jobs, such as small jobs that can be easily restarted in case of error. For example, micro services (e.g., Amazon Lambda service or @HOME projects) and parts of high parallelized computations are examples of such jobs. These types of hardware hosting are suitable for very specific types of workloads, which is a continuation of the micro-services concept (e.g., Google for "flock of birds"). For example, such solutions will be suitable for tasks that can fail at any time. Also, this hardware hosting can act as a service that provides CPU time for small and fast tasklets.

However, the fulfilling of the "trust" requirement is more complicated. As described above, a client device (who has sent a job) generally cannot trust the hardware provider (on whose node the job will be executed) and vice versa. Moreover, there is no clear and efficient way for the gate 22 of the cloud to ensure this trust requirement. Accordingly, what is needed is a system and method for providing secure distributed compute platform on untrusted hardware.

SUMMARY

Thus, a system and method is disclosed for providing distributed compute functions on untrusted hardware. In one exemplary aspect, the method includes providing a hypervisor on the untrusted computing node; receiving, by the untrusted computing node, a request generated by a client device to perform a computing function for the client device using hardware of the untrusted computing node; in response to the received request, creating, an enclave in memory of the untrusted computing node and launching a virtual machine in the memory enclave; verifying, by a guest operating system in the virtual machine, security of the untrusted computing node; and performing, by the guest operating system, the computing function using the hardware of the untrusted computing node upon the guest operating system verifying the security of the untrusted computing node.

In another exemplary aspect, the method includes receiving, by a broker, the request generated by the client device; and transmitting, by the broker, the request to the untrusted computing node to perform the computing function using the hardware of the untrusted computing node.

In another exemplary aspect, the method includes registering, by the untrusted computing node, with the broker to offer use of the hardware of the untrusted computing node; and receiving, by the untrusted computing node from the broker, an operating system image that includes the hypervisor.

In another exemplary aspect, the method includes transmitting an indication that the untrusted computing node cannot perform the requested computing function if the guest operating system in the virtual machine cannot verify the security of the untrusted computing node.

In another exemplary aspect, the method includes relocating the hypervisor in the memory enclave after the memory enclave is created by the hypervisor.

In another exemplary aspect, the guest operating system verifies the security of the environment by obtaining a digital signature of the trusted boot module; and transmitting, by the guest operating system, the digital signature of the trusted boot module to a third party authority that validates the digital signature and provides a response to the guest operating system.

In another exemplary aspect, the method includes performing a chain of trust to verify the virtual machine is running on a secure computing node and a trusted hypervisor, the chain of trust including verifying, by a BIOS of the untrusted computing node, the hardware of the untrusted computing node and then starting a boot loader; verifying, by the boot loader, the BIOS and then starting a kernel of the operating system; verifying, by the kernel, the boot loader, and then starting the hypervisor; verifying the kernel by the hypervisor running on the kernel, and then creating a virtual machine; verifying, the untrusted computing node by a guest operating system in the virtual machine.

In another exemplary aspect of the method, the validation of each of the hardware, the BIOS, the boot loader and the kernel comprises calculating a respective checksum and comparing the respective checksum to a predetermined built-in value of the checksum.

In another exemplary aspect, the method includes transmitting, by the untrusted computing node, a result of the computing function to the broker to be provided to the client device.

In another exemplary aspect, the method includes determining, whether the data associated with the computing function is homomorphically encrypted; when the data associated with the computing function is homomorphically encrypted, putting at least a portion of the data associated with the computing function outside of the enclave; and performing the computing function on the encrypted data which is outside of the memory enclave.

In another exemplary aspect, a system is disclosed for providing a secure computing platform. In this aspect, the system includes an untrusted computing node having memory; a hypervisor on the untrusted computing node, the hypervisor configured to create an enclave in the memory of the untrusted computing node upon receiving a request generated by a client device to perform a computing function on the untrusted computing node, and launch a virtual machine in the memory enclave; and a guest operating system in the virtual machine configured to verify security of the untrusted computing node and the hypervisor running on the untrusted computing node, and perform the computing function on the untrusted computing node upon the verifying of the security of the untrusted computing node and the hypervisor.

In another exemplary aspect, a system is disclosed for providing a secure computing platform on an untrusted computing node. In this aspect, the system includes a broker configured to receive a request generated by a client device to perform a computing function on a remote hardware node, select the untrusted computing node from a plurality of remote hardware nodes to performing the computing function, and transmit the request to the selected untrusted computing node to perform the computing function on the untrusted computing node, wherein in response to the received request, the untrusted computing node is configured to create an enclave in memory of the untrusted computing node and launch a virtual machine in the memory enclave, and wherein a guest operating system in the virtual machine is configured to verify security of the untrusted computing node and a hypervisor running on the untrusted computing node, and perform the computing function on the untrusted computing node upon the guest operating system verifying the security of the untrusted computing node and the hypervisor.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various exemplary aspects are now described with reference to the drawings, wherein like reference numerals are used to refer to like elements throughout. In the following description, for purposes of explanation, numerous specific details are set forth in order to promote a thorough understanding of one or more aspects. It may be evident in some or all instances, however, that any aspect described below can be practiced without adopting the specific design details described below. In other instances, well-known structures and devices are shown in block diagram form in order to facilitate description of one or more aspects. The following presents a description of one or more exemplary aspects in order to provide a basic understanding of the disclosed system and method. This description is not an extensive overview of all contemplated aspects, and is not intended to identify key or critical elements of all aspects nor delineate the scope of any or all aspects.

Figure 2A:
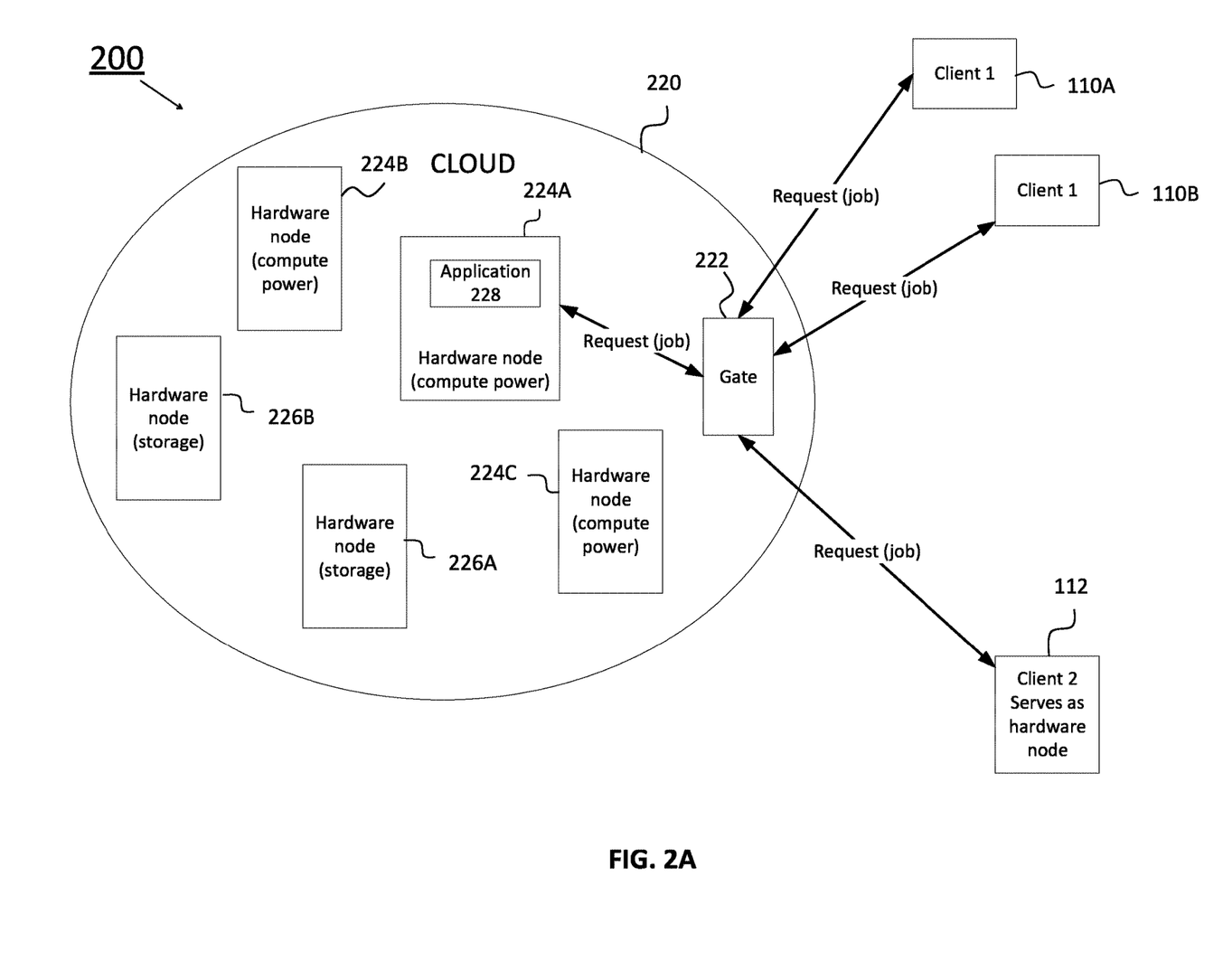
FIG. 2A illustrates a high-level block diagram of a system for providing computing platform on untrusted hardware according to an exemplary aspect.

FIG. 2 illustrates a high-level block diagram of a system 200 for providing computing platform on untrusted hardware according to an exemplary aspect. As shown, a plurality of client devices 110A and 110B can each request one or more jobs to be performed remotely by a hardware node. The cloud computing system 220 includes a gate 222 (or "broker") and a plurality of hardware nodes within the cloud, including hardware nodes 224A to 224C (for compute power) and hardware nodes 226A and 226B (for data storage). It should be appreciated that client devices 110A and/or 110B can be any type of computing device, such as a laptop, a desktop, a tablet, a mobile phone, a server and the like. Similarly, gate 222 and each of the hardware nodes 224A to 224C and 226A to 226B can be a networked computer that is part of the cloud computing system 220 and that is configured to perform designated functions (e.g. computer data storage). Moreover, although not specifically shown, it should be appreciated that the client devices 110A and 110B as well as client node 112 (i.e., the hardware provider discussed below) can communicate with cloud 220 by any type of applicable data communications network. For example, the applicable network can be any network for communicating data and data operations and can include a communication system (not shown) that connects the various components of the system by wire, cable, fiber optic, and/or wireless links facilitated by various types of well-known network elements, such as hubs, switches, routers, and the like. It should be appreciated that the network may employ various well-known protocols to communicate information amongst the network resources. In one aspect, the network can be part of the Internet or intranet using various communications infrastructure such as Ethernet, WiFi and the like.

Accordingly to an exemplary aspect, a first client device 110A can transmit a job request (e.g., data storage or a computing function) to the cloud computing system 220, which will be received by gate 222 and then assigned to an appropriate hardware node. For example, the job request may require execution by an application (e.g. application 228 that is installed on hardware node 224A). Thus, the gate 222 will receive the request from client device 110A, determine the availability of hardware node 224A, and then assign hardware node 224A for job execution. Upon completion, the gate 222 will then transmit the results of the job execution back to client device 110A.

In an exemplary aspect, the requested task is performed so that the client device 110A can easily confirm the results of the job. In other words, the client device 110A itself should verify the result according to an exemplary aspect. Thus, after the client device 110A receives the result, the client device 110A can check/verify it and accept or reject it. Thus, preferably, the disclosed system and method is use in cases where the result can be verified easily and quickly. One example is cryptocurrency mining, in which the identifying (i.e., selecting, finding or calculating) of the nonce is a difficult operation, which can be performed in a cloud, but the verification of the correctness of the nonce correctness is a very fast operation, which can be performed by the client device 110A.

In any event, as further described above, there can be certain environments/configurations where a hardware provider or hardware lord (e.g., client device 112) is registered with the cloud computing system 2220 in order to offer hardware functionalities for job execution. Moreover, as shown in FIG. 2, such hardware lords can be remotely located and outside the trusted/secure network of cloud computing system 220. Thus, according to the exemplary aspect, if the client device 110B sends a job request to gate 222 that can be executed by the remotely located hardware lord, the gate 222 will in turn assign the job to client device 112 as the hardware node.

According to the exemplary aspect, the disclosed system is configured to provide for a secure distributed computing function by client device 112, which would otherwise be considered an "untrusted computing node" by requesting client device 110B. As will be described in detail below, before the untrusted computing hardware node 112 (i.e., the hardware lord or provide) can begin performing the requested job, a verification process is performed to ensure that hardware node 112 is secure and trusted and that the application(s) residing on the node to perform the task cannot be compromised by other applications running on the hardware node.

Figure 2B:
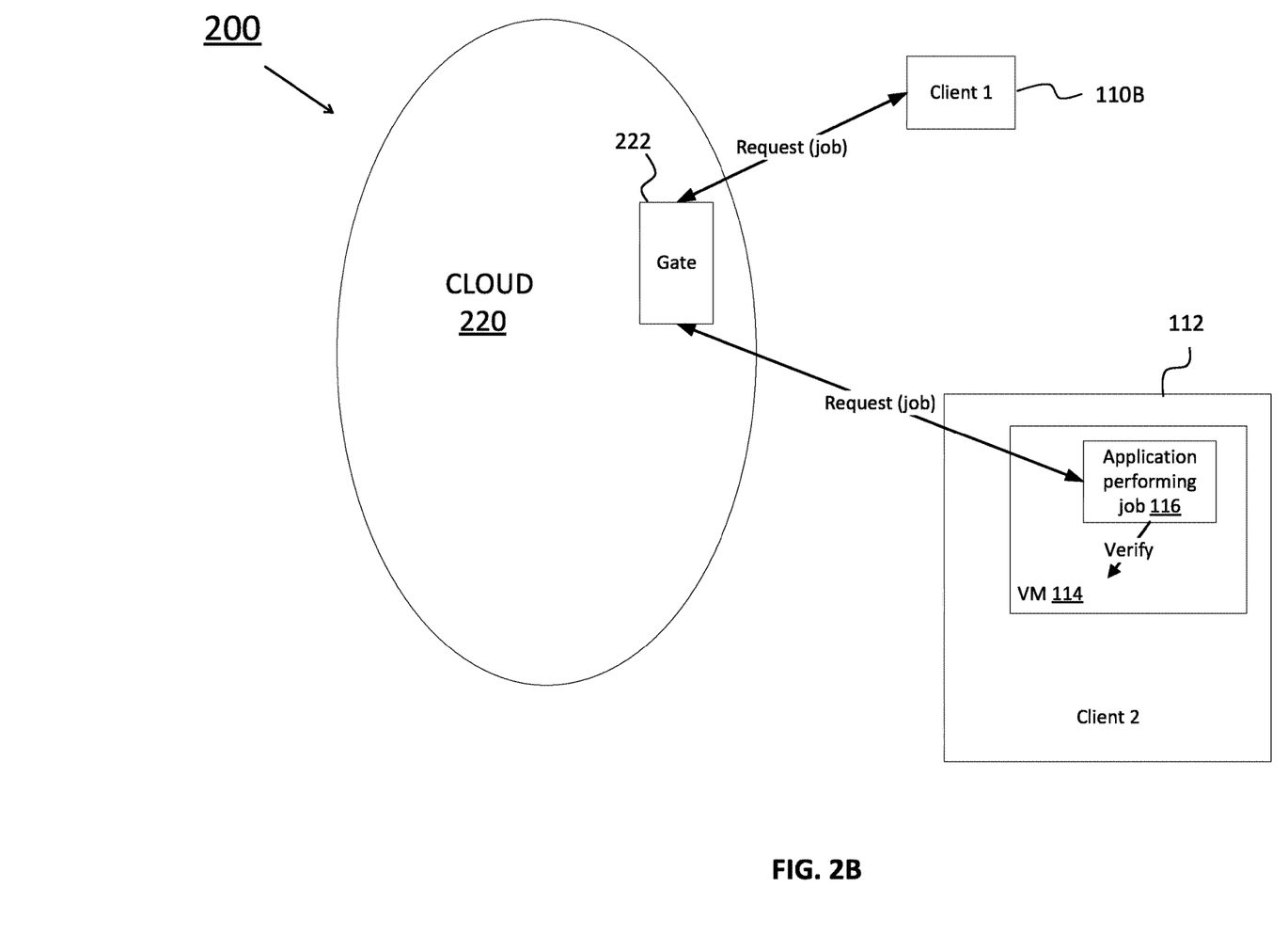
FIG. 2B illustrates a more detailed block diagram of a system for providing computing platform on untrusted hardware according to an exemplary aspect.

FIG. 2B illustrates a more detailed block diagram of the system 200 for providing computing functions on untrusted hardware according to an exemplary aspect. As shown, the system 200 includes some of the same components described above with respect to FIG. 2A. In particular, the system 200 includes client device 110B, gate 222 of cloud 220, and client device 112, which can serve as the remotely located hardware node for executing the requested job received from client device 110B.

According to an exemplary aspect, the hardware node (e.g., client device 112) must first be registered with the broker (i.e., gate 222) before it is available to provide remote hardware compute services. To do so, the client device 112 may contact the broker 222 or otherwise transmit a registration request to the brokering side and offer its hardware functionality or a portion thereof for performing job services as described herein. Upon registration/confirmation, the hardware node 112 can download and run a host operating system ("OS") with unmodifiable OS kernel, that will include all of the required functionality, including memory enclaves, a trusted hypervisor (which will create VMs, e.g., VM 114), trust boot, and the like, as will be described in more detail below. According to the exemplary aspect, the downloaded OS can be compiled (e.g., by broker, before downloading by HW provider) accordingly so that each component can be verified as "trusted" during a verification process performed by a special verification software that will be described in more detail below.

In the exemplary aspect, the trusted hypervisor installed on the hardware node 112 can be used to protect the client device 110B from client device 112 and vice versa. Thus, during operation, the job is started in the VM 114 of client device 112. The trusted hypervisor can be configured to guarantee that other programs running on this hardware node (i.e., on client device 112) will not be able to compromise or interfere with the applications in this VM 114 that are provided to execute the requested job received from the gate 222, as the applications (in VM) will be isolated and protected in a memory enclave as discussed in more detail below. It is noted that in general, guest OSs in a VM typically do not verify on which hypervisor the guest OS is running. However, when the client device 112 is operating as a hardware provider according to disclosed system and method, such verification is required because the lower part of the stack is considered untrusted.

Thus, in the exemplary aspect, the hypervisor installed on hardware node 112 can be configured to allocate private regions of memory (to create memory enclaves) to provide for secure job execution. For example, in one aspect, the hypervisor may use technologies including, for example, Intel SGX and TXT to provide this secure environment. Intel SGX technology (i.e., Intel "Software Guard Extensions") is a security extension (including a set of CPU code instructions) from Intel that allows user-level code to allocate private regions of memory, creating the memory enclaves, such that any access to the memory is possible only from the same enclave. Moreover, the hypervisor can be configured to ensure that the guest operating system starts in a trusted environment. For example, the trusted hypervisor may also use, for example, Intel TXT technology (Intel "Trusted Execution Technology") (or any other technology which provides the ability to verify where the code is running) to verify that the software is running on the hardware node and, specifically in the VM in the created memory enclave.

The hypervisor is configured to run the VM 114 in its own memory enclave on client device 112. To do so, once a job is assigned by gate 222 to the hardware node 112 (i.e., to be performed by application 116), the downloaded guest OS in the VM 114 first verifies whether the guest OS is booted on the trusted hypervisor and in the designated memory enclave. In general, it is noted that memory enclaves are memory regions where access is restricted by the computer processing unit ("CPU") of the hardware node, such that any read from or write to commands into the enclave are only permitted if the CPU instruction making such a request is itself inside the same enclave. Effectively, this prevents other (external) applications from improperly compromising/controlling the application 116 from performing the requested job.

Moreover, the hypervisor can additionally relocate itself and run in the created memory enclave according to an exemplary aspect, although there can be means used to protect the hypervisor to be sure that the code of hypervisor will not be changed. In the exemplary aspect, the hardware node will boot using an operating authentication program/engine (i.e., trusted boot module), such as Intel TXT, for example, so that the system can be sure that the application 116 will be securely executed to perform the requested job. In such a trusted OS, the hypervisor will be protected according to the following processes. For example, the hypervisor will be protected if the whole OS kernel is protected from modification (e.g., by forbidding kernel modules loading, forbidding reading from certain system files, which provide direct memory access). Moreover, as will be described below, a chain of trust can be used such that the part of hypervisor that is loaded form the disk can be verified by OS kernel during loading from the disk. The kernel will be considered trusted and protected from modification, such that it can in turn verify the hypervisor. As a result of this verification, the gate 222 will know that the hypervisor is trusted, and, therefore, the application 116 provided for performing the requested job is secure and trusted.

Figure 3:
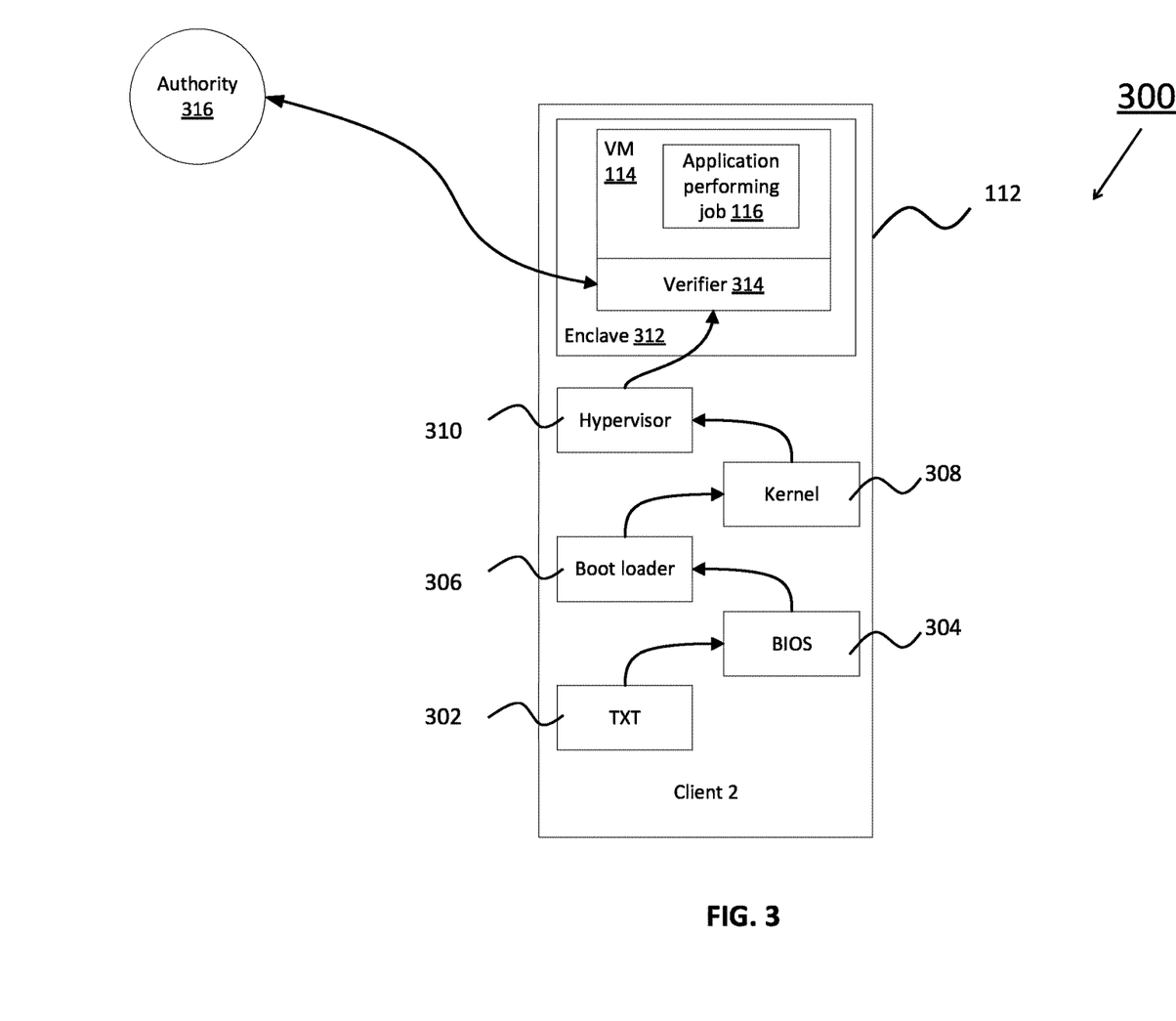
FIG. 3 illustrates a block diagram with a flowchart for providing a chain of trust in a system for providing computing platform on untrusted hardware according to an exemplary aspect.

FIG. 3 illustrates a block diagram 300 that includes a flowchart for providing a "chain of trust" in the exemplary system for providing computing functions on untrusted hardware according to an exemplary aspect. First, as described above, the system will boot with Intel TXT 302 (or similar), for example. Next, the BIOS 304 ("basic input/output system") that controls the booting process of the OS can verify the hardware and start the OS boot loader 306. In turn, the boot loader 306 can verify the BIOS 304 and start the OS kernel 308 (e.g., the core software program of the host OS). The kernel 308 may then verify the boot loader 306. Next, the hypervisor 310 (described above) may verify the kernel 308. Finally, according to one exemplary aspect, the guest OS in VM 114 running by the hypervisor 310 is configured to verify the node (using TXT) 310 as trusted, using, for example, an external authority 316. Thus, using the "chain of trust" as shown in FIG. 3, the gate 222 can verify that the program (i.e., application 116) running in the VM 114 will be executed securely on the determined hardware node 112 and in the trusted hypervisor 310.

Accordingly, as described herein, each component in the "chain of trust" is able to verify the previous component using the same verification procedure, i.e., each component in the chain of trust can verify the node using TXT and so be sure that all previous components are trusted, but this kind of verification is obligatory only for the last component in the chain, i.e. for guest OS. Also, each component validates the next component before starting it. Thus, when a component needs to start the next component in sequence before giving control to the next component, the current component will first load the next component into memory. After loading, a checksum can be calculated for the loaded component that is validated by the current component to ensure that the checksum matches a built-in-value (i.e., the value is built (during compilation, e.g. as a static variable) into the component that performs the load). For example, in one aspect, if a current component $C_n$, is loaded and running and is ready to load the next component $C_{n+1}$, the checksum of $C_{n+1}$ will be calculated and validated, so that only the components with right checksum can be executed. Since the checksum is validated (e.g., it is equal to a predefined static variable, or, in some aspects, checked using external authority), the checksum of $C_{n+1}$ can be considered "trusted". Thus, when the next component $C_{n+1}$ is loaded into memory by the current component $C_n$, and it's checksum is calculated by the current component $C_n$, the newly-loaded component $C_{n+1}$ can be considered "trusted", if the calculated checksum matches the static value of the checksum (and no external authority is required, in some aspects). As a result, each component can determine what the next component should look like, i.e., hence performing "chain of trust" of the sequence of components. Once the checksum is validated for each component, the control is passed to the next component in the chain until the VM 114 verifies the hypervisor 310 (using the external authority, for example).

However, according to refinement of the exemplary aspect, it is noted that at any point in the "chain of trust", the active component can request the first component in the chain for its signature and then connect to a third party (i.e., authority 316) to verify that the signature is valid. For example, as described above, the VM 114 running in the hypervisor 310 is configured to verify the node (and so in view of the chain of trust verify the hypervisor 310), by sending a signature of the TXT 310 to the external authority 316 for verification. In some aspects, it additionally verifies and validates all other components in the chain of thrust. In general, there are many existing third-party authorities configured to verify such signatures (e.g., like web certificates) and that the details of which should be known to those skilled in the art and not described herein.

In a refinement of the exemplary aspect, the kernel 308 is compiled to protect itself from being modified by user of the hardware node (i.e., client device 112). The components in the chain of trust can be additionally secured, for example, in an aspect, the OS kernel can be protected from modification. For example, for a user of a computing system to modify the kernel 308, the user (e.g., client device 112) needs to obtain special permissions (e.g., in Linux they are called "ring0 capabilities"). However, these capabilities can only be provided by the kernel 308 itself. Thus, according to the exemplary aspect, in order to protect the kernel 308 from the user or applications running on the hardware node, the kernel 308 is compiled (by the cloud 220, for example) to not be able to provide such modification permissions/capabilities. However, any other way of protecting the kernel can also be used. Moreover, using the "chain of trust" algorithm described above, the hardware node 112 is controlled to only be able to load this restricted kernel 308. As a result, the loaded restricted kernel is prevented from being able to provide capabilities to the hardware node 112 that would otherwise enable it to modify the kernel 308.

Figure 4:
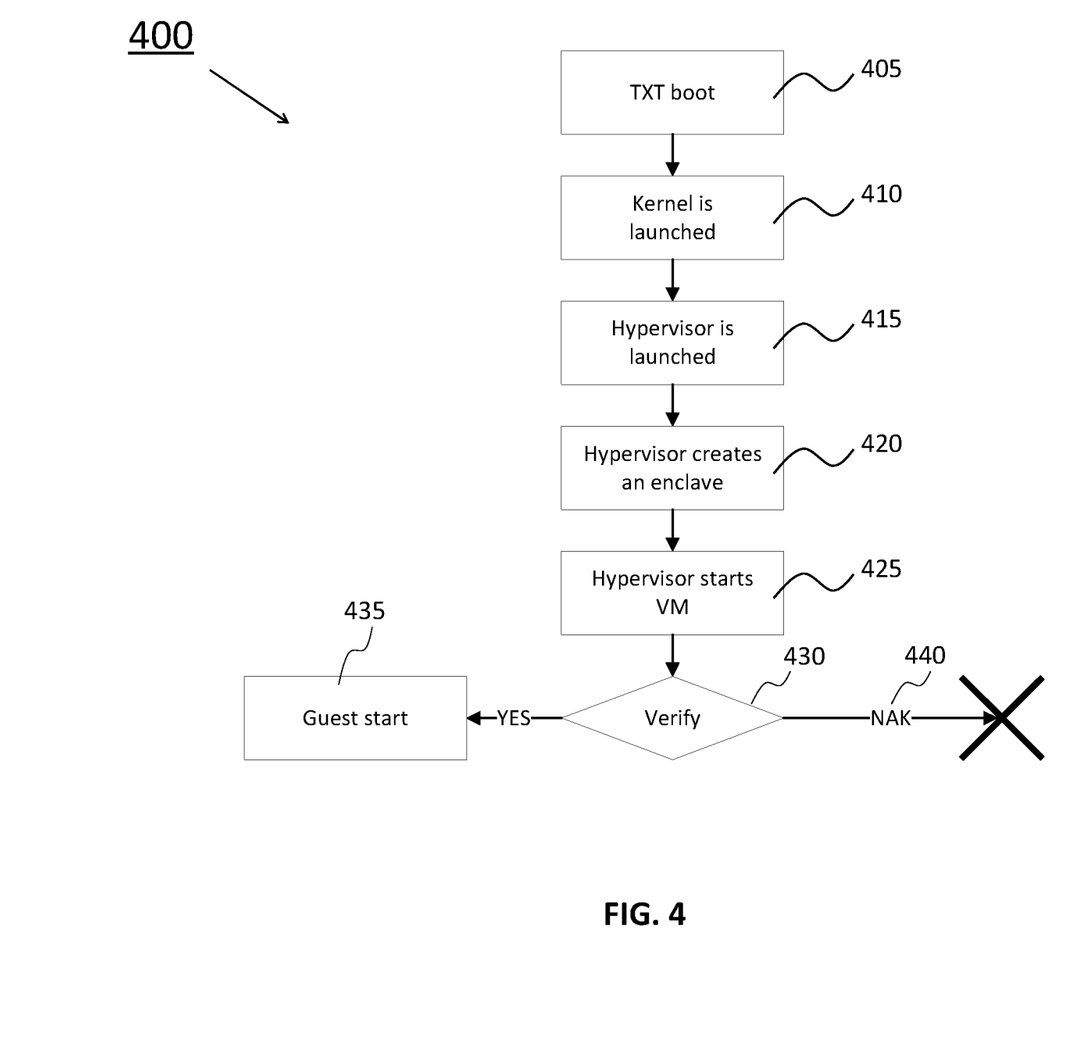
FIG. 4 illustrates a flowchart for a method for providing computing platform on untrusted hardware according to an exemplary aspect.

FIG. 4 illustrates a flowchart for a method 400 for providing computing functions on untrusted hardware according to an exemplary aspect. It should be appreciated that the disclosed method is performed on the hardware node provided as the client device 112, for example. As shown, initially, at step 405, the hardware node is booted using Intel TXT, as described above. After initial booting, the kernel 308 is launched at step 410, which in turn launches the hypervisor 310 at step 415.

Once the gate 222 receives a request from another client device (e.g., client device 110B), the gate 222 determines the type of job and possibly assigns this job to a remote (and possibly untrusted) hardware node, such as client device 112. After receiving the job from the gate 222, the hypervisor 310 (at step 420) creates a memory enclave (e.g., enclave 312) and begins running a VM 114 (step 425) inside the created memory enclave 312. It should be appreciated that creation of the memory enclave 312 is architecture specific. For example, Intel SGX, as described above, configures enclaves using special machine-specific registers, for example. Of course, it should also be appreciated that the exemplary system and method are not to be limited to using Intel SGX for creating the memory enclaves and that alternative architectures can be used according to exemplary aspects. In some aspects, once created, the hypervisor 310 additionally can relocate itself into the created enclave and then gives control to its instance located inside enclave.

After the memory enclave is created, the guest OS in the VM 114 running in this enclave is then configured to verify the hardware node and the hypervisor 310. More particularly, according to an exemplary aspect, a special program is executed inside the VM 114 (e.g., verifier 314) that is configured to connect to one or more external authorities 316 in order to check that the VM 114 is running on the host supporting Intel TXT. Based on this verification, the system can confirm whether the VM 114 is running on the determined host, in the trusted system, and so in trusted hypervisor, and so in the memory enclave , e.g., 312. If verification succeeds, the guest OS then perform the job, (i.e., the job can be started in the VM 114 by application 116, for example). Otherwise, if verification cannot be completed, the verifier 314 is configured to send to the gate 222 a "NAK" (i.e., a negative acknowledgment or not acknowledged) message 440 to indicate that the hardware node cannot be verified, and, therefore, the requested job cannot be performed. In some other aspects, the broker first can sent to guest OS a request in order to check whether it is working on "trusted" system and then after the respond of the guest OS send the data about the particular job.

It should be appreciated that the exemplary verification process can be performed each time a new job is requested by a different client device (e.g., client device 110A and 110B) and received by hardware node 112. That is, if the hypervisor 310 receives from broker/gate a job sent by a new client device (e.g., client device 110A), then the hypervisor 310 can create a new VM to perform this newly-requested job. In an alternative aspect, if the hypervisor 310 receives several jobs belonging to the same user (e.g., multiple jobs received from client device 110B), the hardware node 112 can be configured to execute all of the requested jobs in the same VM 114 in the created enclave 312. Thus, if the hypervisor 310 has a VM 114, for example, that corresponds to a particular user (e.g., client device 110B), and the hypervisor 310 receives a new job from this particular user, the hypervisor 310 can run the job in this previously-created VM 114 because the trust and security of the hardware node 112 has already been verified for this client device 110B. In some aspects, the hypervisor can create a new VM each time a new job comes.

Figure 5:
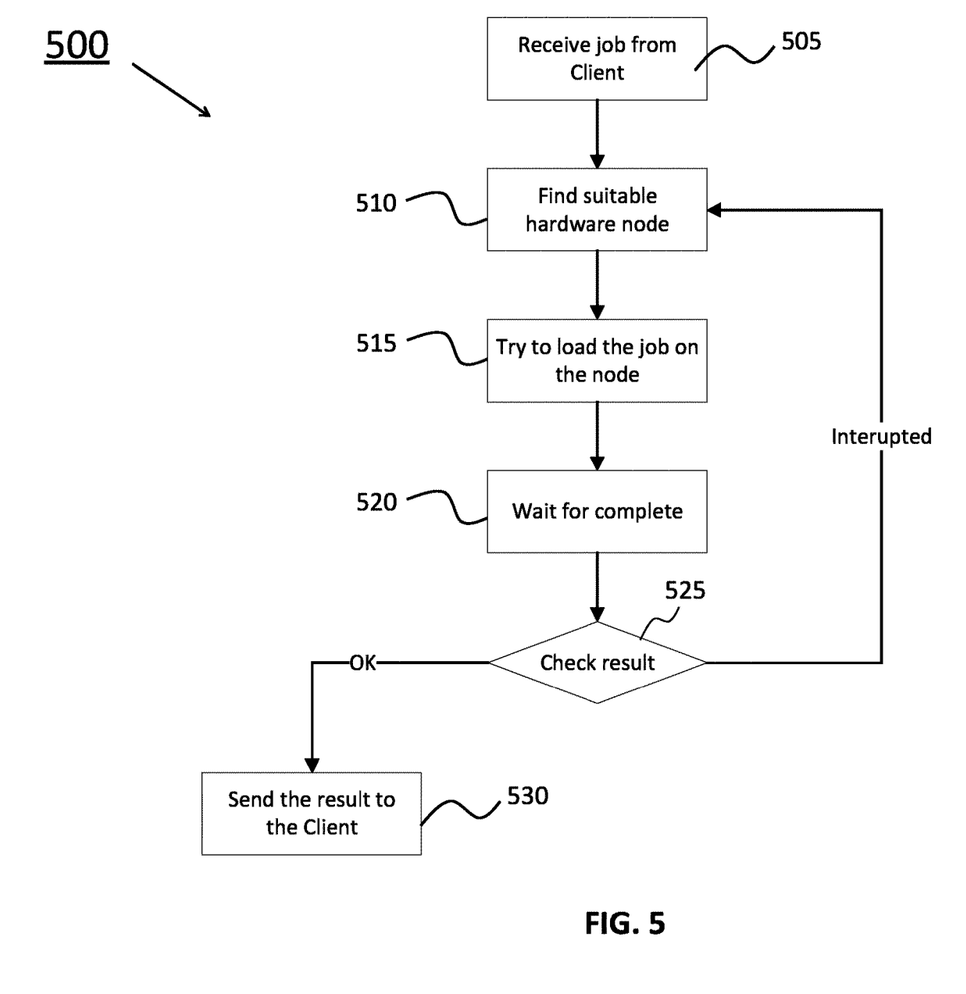
FIG. 5 illustrates a flowchart for a method for assigning a received job request on an untrusted hardware according to an exemplary aspect.

FIG. 5 illustrates a flowchart for a method 500 for assigning and starting a received job request on an untrusted hardware according to an exemplary aspect. In particular, the method shown on FIG. 5 illustrates an example of the work of the gate 222 of cloud computing system 220, described above. In particular, at step 505, the gate 222 initially receives a job from a client (e.g., client device 110B), to perform a particular job, such as to perform some type of computing function as would be appreciated to one skilled in the art. In turn, the gate 222 is configured to identify a hardware node (e.g., client device 112) that is capable of performing the requested job (e.g., it has the appropriate software application(s) installed thereon) and that it is available to perform the job. For example, it should be appreciated that a plurality of independent (belonging to HW providers) hardware nodes (and, for example, also several other nodes belonging to the cloud) can be registered with the brokering side (e.g., gate 222) and their availability (and available functionality) can be stored in a queue by gate 222 (or gate can choose those that has the least load at the moment). Moreover, according to exemplary aspects, the queue can include information about the statistics about "reliability" of the particular hardware nodes based on the stability on the previous job execution. Using these reliability statistics, the available hardware nodes can be weighted accordingly with the nodes having the highest reliability statistics being automatically moved to the top of the queue.

Thus, when the request for a job is received by gate 222, the gate 222 will attempt to find a hardware node at step 510 (using the hardware node queue as one example). Next, at step 515, the gate 222 will assign the job to the identified hardware node (e.g., client device 112) and attempt to load the job on the assigned hardware node. The gate 222 will then wait for the job completion at step 520, which will typically include both the verification process described above, and, if verified, the actual completion of the job. At step 525, the result will be transmitted back from the hardware node 112 to the gate 222. This result can be an indication that the hardware node was verified and the data results of the completed job. Upon confirmation by the gate 222, the gate 222 will then send the results back to the originally requesting client device (e.g., client 110B) at step 530. Otherwise, the gate 222 receives an indication that the hardware node 112 cannot be verified (as described above) and/or that it cannot complete the requested job (e.g., a NAK message or interrupt result may be sent back to the gate 222). As shown, this result returns processing to step 510 where the gate 222 will identify the next hardware node available and capable of performing the requested job. This process can be repeated until the job is finally and correctly executed and the results are sent to the originally requesting client device (e.g., client device 110B).

Thus, it should be appreciated that according to the exemplary aspect, at step 515, the gate 222 sends the job to a selected hardware node (e.g., client device 112). Then the algorithm described above with respect to FIG. 4 is performed on that node for verification of trust. After successful verification in the VM 114 of the selected hardware node, the gate 222 can be sure that no other application(s) will improperly compromise the result performed by the designated application (e.g., application 116). Therefore, when the gate 222 (i.e., the broker) receives the completed result, the gate 222 can be sure that the result is correct. Also, as further explained above, the gate 222 can receive a message from the verifier 314 running in the VM 114 (e.g. NAK), indicating that the VM 114 of that node is not secure. Or yet further, the gate 222 can receive no message, i.e., if the job in VM 114 was unexpectedly terminated or if the connection was broken (e.g., in this case the gate 222 will be interrupted by a timer). In any such cases, the gate 222 will attempt to find the next appropriate hardware node to perform the requested job as further described above.

Figure 6:
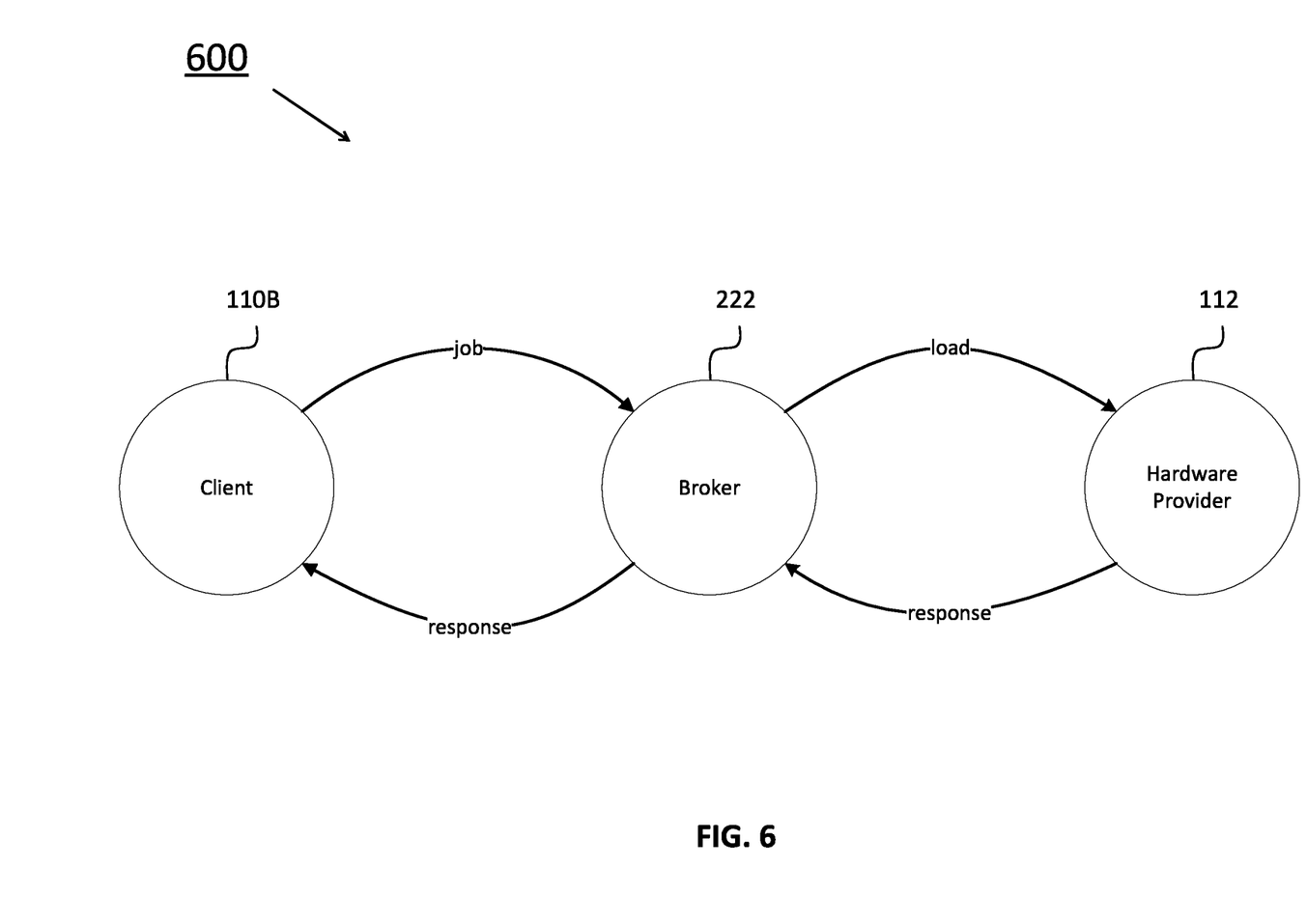
FIG. 6 illustrates a high level flow diagram for a method for providing computing services on untrusted hardware according to an exemplary aspect.

FIG. 6 illustrates a high level flow diagram for a method for providing computing functions on untrusted hardware according to an exemplary aspect. Essentially, as described above, there are there many "actors" for performing the disclosed method. First, the client device 110B sends a job to a gate 222 (also called "broker"), which can be part of a cloud computing system 220, for example. Next, the broker 222 sends the received job to the identified hardware provider 112 (also referred to has a hardware lord). Then, after verification, the hardware provider (e.g., client device 112 described above) sends the response to broker 222, which will check the result and if it is verified, send the response to client 110B. Otherwise, the broker 222 restarts the operation as further described above.

Thus, according to the exemplary aspects described herein, there is the broker 222, following the algorithm of FIG. 5 described above, and the client's hardware node 112, which is a part of a distributed compute cloud 220, having the trusted hypervisor 310, which is able to create the memory enclave for each VM 114. Moreover, the special hardware verification program (e.g., verifier 314) in the VM 114 is configured to check that the VM 114 is running in a secure enclave 312 and send messages to the broker 222 that confirms the authority and security of the application 116 performing the requested task.

Figure 7:
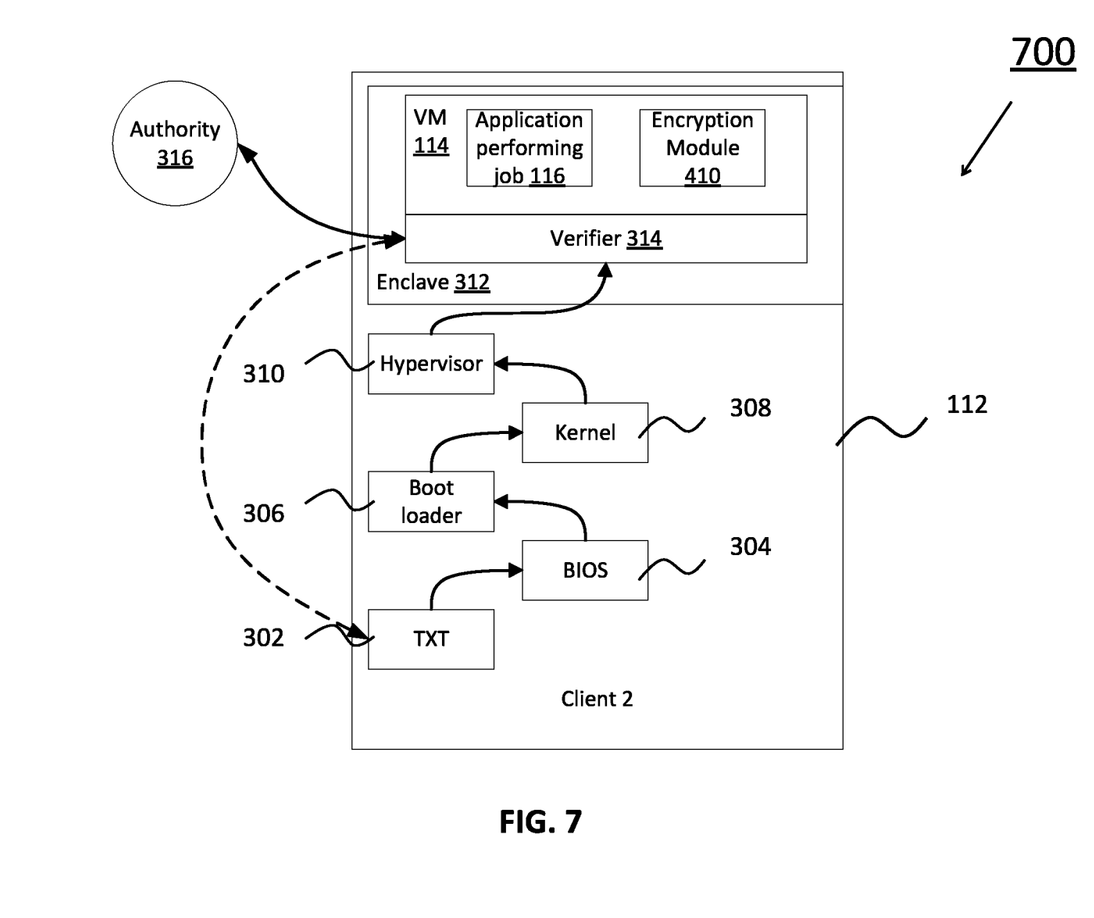
FIG. 7 illustrates a block diagram with a flowchart for providing a chain of trust in a system for providing computing platform on untrusted hardware according to another exemplary aspect.

FIG. 7 illustrates a block diagram with a flowchart for providing a chain of trust in a system for providing computing functions on untrusted hardware according to another exemplary aspect. As shown, the block diagram 700 includes mainly the same components described above with respect to FIG. 3, and, as such, the description of these components will not be repeated herein.

In some aspects, the client 110B can send in the request data, which is already homomorphically encrypted. Or in some other aspects, as additionally shown, the client hardware node 112 can also be installed with an encryption module 410 that can be provided for homomorphic encryption so that some or all of the work (e.g., computations) for the requested task can be performed on the data received from the requesting client (e.g., client 110A and/or 110B) as ciphertext rather than as plaintext. As a result, in the aspects, where the data is homomorphically encrypted, the requested work can be performed outside (or without the use of) the memory enclave 312, i.e., such encrypted data can be put outside of the enclave. In some aspects, the code (which is in the enclave) works with the homomorphically encrypted data (in the view of ciphertext), which is located outside of the enclave. Or, in some other aspects, another application for performing the work can be located outside the memory enclave 312 and perform the requested work based on ciphertext output from the encryption module 410.

In some aspects, the encryption module is used not (or not only) to perform the homomorphic encryption, but (or but also) to verify the TXT signature of the node using external authority.

In some aspects, if the is a possibility of fast verification of the result of the computing function (and, additionally, if the hosting client is not against the fact that it will be able to see the code), the code of the application can be put outside of the enclave. The examples of such tasks can be: finding big prime numbers or selecting cryptocurrency nonces. In such aspects, either the broker, or the client 110B, or the other part of the code inside of the enclave verifies the result of the computation.

If both these conditions are fulfilled (i.e., data is encrypted and the result can be easily verified) then both the code and the data of the computation function could be placed outside of the enclave, and in some aspects the enclave is not needed.

Thus, in an exemplary aspect, when the data is received for the requested task, the client 110B can instruct the system (e.g., the broker, and then the broker will instruct guest OS in the VM in client 112) whether the code and the data should be placed in the memory enclave 312 or not, in which case the requested work can be performed outside the memory enclave 312, for example. In a variation of this aspect, the hypervisor 310 or VM 114, for example, can determine whether the encryption is used (e.g., determine whether the encryption module 410 is installed on the client 112) to determine whether the requested task should be performed by the application 116 in the memory enclave 312 or using homomorphic encryption by the encryption module 410.

Thus, by providing the encryption module 410, the system can advantageously use homomorphic encryption to perform the requested task without putting the code or data in the memory enclave 312. In a variation of this aspect, a portion of work can be performed using homomorphic encryption, such that this homomorphically encrypted data can be placed outside the memory enclave 312. Moreover, in an exemplary aspect, if the algorithm of computing function provides verification of correctness of the result, then it could be computed outside of the enclave. Furthermore, if both conditions are satisfied (i.e., data is homomorphically encrypted, and the result of computing function can be verified), then memory enclave 312 is not used at all according to another exemplary aspect.

Figure 8:
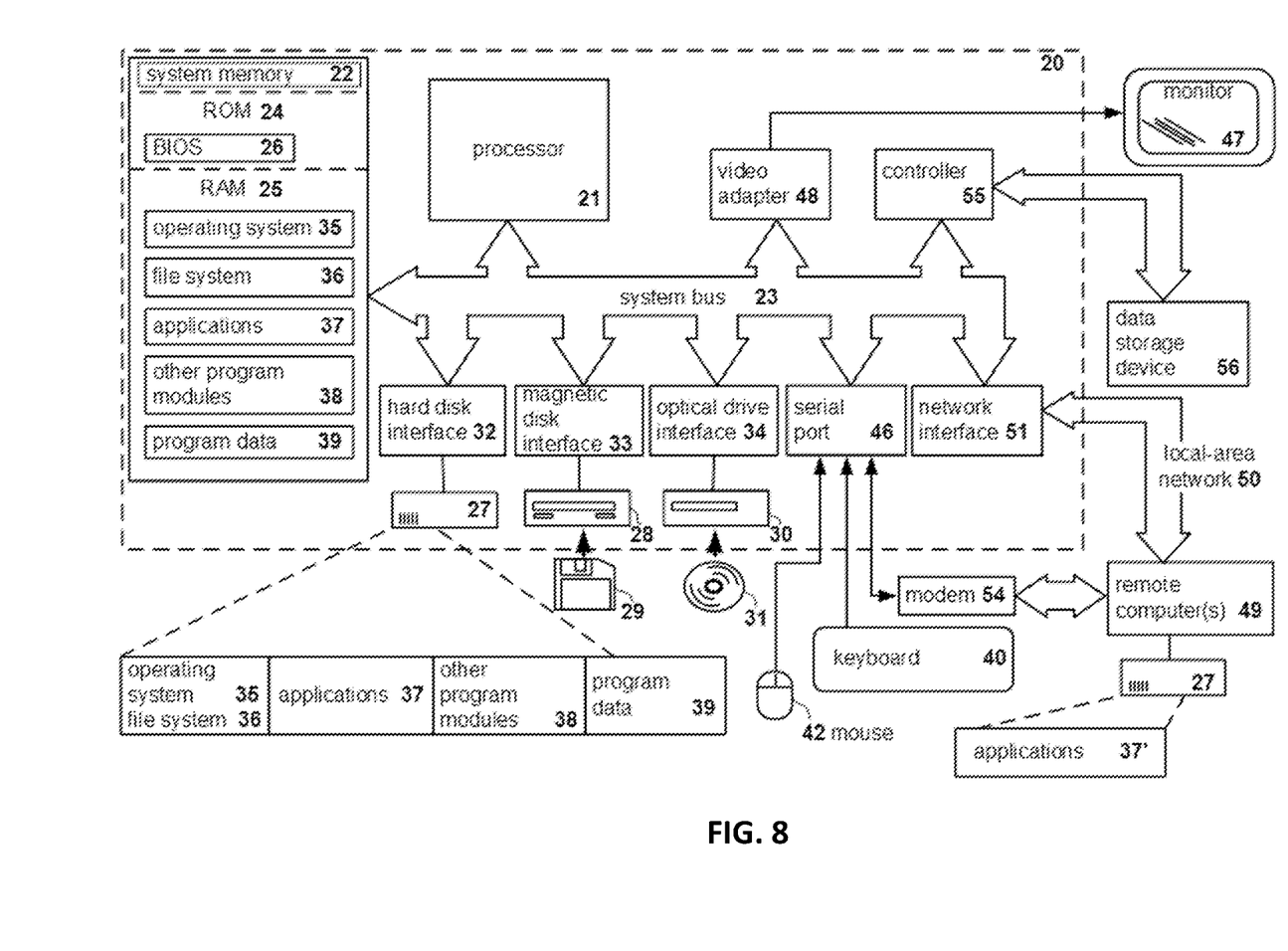
FIG. 8 is a block diagram illustrating a general-purpose computer system on which aspects of systems and methods may be implemented in accordance with an exemplary aspect.

FIG. 8 illustrates a block diagram illustrating a general-purpose computer system 20 on which aspects of systems and methods may be implemented in accordance with an exemplary aspect. It should be noted that the computer system 20 can be used to implement the client device 112 (i.e., the hardware provider or hardware lord) as well as gate 222, as described above, for example.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

As described above, computer system 20 may operate in a network environment, using a network connection to one or more remote computers 49. The remote computer (or computers) 49 may be local computer workstations or servers (e.g., gate 222) comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 6, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A method for providing a secure computing platform on an untrusted computing node, the method comprising:
   providing a hypervisor on the untrusted computing node;
   receiving, by the untrusted computing node, a request generated by a client device to perform a computing function for the client device using hardware of the untrusted computing node;
   in response to the received request, creating, an enclave in memory of the untrusted computing node and launching a virtual machine in the memory enclave;
   determining, whether data associated with the computing function is homomorphically encrypted;
   when the data associated with the computing function is homomorphically encrypted, putting at least a portion of the data associated with the computing function outside of the enclave;
   performing the computing function on the portion of the data which is outside of the memory enclave;
   verifying, by a guest operating system in the virtual machine, security of the untrusted computing node; and
   performing, by the guest operating system, the computing function on a portion of the data inside the memory enclave using the hardware of the untrusted computing node upon the guest operating system verifying the security of the untrusted computing node.

2. The method according to claim 1, further comprising:
   receiving, by a broker, the request generated by the client device; and
   transmitting, by the broker, the request to the untrusted computing node to perform the computing function using the hardware of the untrusted computing node.

3. The method according to claim 2, further comprising:
   registering, by the untrusted computing node, with the broker to offer use of the hardware of the untrusted computing node; and
   receiving, by the untrusted computing node from the broker, an operating system image that includes the hypervisor.

4. The method according to claim 2, further comprising transmitting an indication that the untrusted computing node cannot perform the requested computing function if the guest operating system in the virtual machine cannot verify the security of the untrusted computing node.

5. The method according to claim 1, further comprising relocating the hypervisor in the memory enclave after the memory enclave is created by the hypervisor.

6. The method according to claim 1, wherein the guest operating system verifies the security of the untrusted computing node by:
   obtaining a digital signature of a trusted boot module; and
   transmitting, by the guest operating system, the digital signature of the trusted boot module to a third party authority that validates the digital signature and provides a response to the guest operating system.

7. The method according to claim 1, further comprising performing a chain of trust to verify the virtual machine is running on a secure computing node and a trusted hypervisor, the chain of trust including:
   verifying, by a BIOS of the untrusted computing node, the hardware of the untrusted computing node and then starting a boot loader;
   verifying, by the boot loader, the BIOS and then starting a kernel of the operating system;
   verifying, by the kernel, the boot loader, and then starting the hypervisor;
   verifying the kernel by the hypervisor running on the kernel, and then creating a virtual machine;
   verifying, the untrusted computing node by a guest operating system in the virtual machine.

8. The method according to claim 7, wherein verification of each of the hardware, the BIOS, the boot loader and the kernel comprises calculating a respective checksum and comparing the respective checksum to a predetermined built-in value of the checksum.

9. The method according to claim 2, further comprising transmitting, by the untrusted computing node, a result of the computing function to the broker to be provided to the client device.

10. A system for providing a secure computing platform, the system comprising:
    an untrusted computing node having memory;
    a hypervisor running on the untrusted computing node and configured to create an enclave in the memory of the untrusted computing node upon receiving a request generated by a client device to perform a computing function on the untrusted computing node; launch a virtual machine in the memory enclave; determine, whether data associated with the computing function is homomorphically encrypted; when the data associated with the computing function is homomorphically encrypted, put at least a portion of the data associated with the computing function outside of the enclave; perform the computing function on the portion of the data which is outside of the memory enclave; and
    a guest operating system in the virtual machine configured to verify security of the untrusted computing node, and to perform the computing function on a portion of the data inside the memory enclave on the untrusted computing node upon the verifying of the security of the untrusted computing node.

11. The system according to claim 10, wherein the untrusted computing node is configured to:
    register with a broker to offer use of the untrusted computing node, and
    receive, from the broker, an operating system image that includes the hypervisor.

12. The system according to claim 11, wherein an indication that the untrusted computing node cannot perform the requested computing function is transmitted to the broker if the guest operating system in the virtual machine cannot verify the security of the untrusted computing node and the hypervisor.

13. The system according to claim 10, wherein the hypervisor is further configured to relocate itself in the memory enclave after the hypervisor creates the memory enclave.

14. The system according to claim 10, wherein the guest operating system is further configured to verify the security of the untrusted computing node by:
    obtaining a digital signature of a trusted boot module; and transmitting the digital signature of the trusted boot module to a third party authority that validates the digital signature and provides a response to the guest operating system.

15. The system according to claim 10, wherein a chain of trust is performed by the system to verify that the virtual machine is running on a secure computing node and a trusted hypervisor, the chain of trust including:
   verifying, by a BIOS of the untrusted computing node, hardware of the untrusted computing node and then starting a boot loader;
   verifying, by the boot loader, the BIOS and then starting a kernel of the operating system;
   verifying, by the kernel, the boot loader, and then starting the hypervisor;
   verifying the kernel by the hypervisor running on the kernel, and then creating a virtual machine;
   verifying, the untrusted computing node by a guest operating system in the virtual machine.

16. The system to claim 15, wherein each of the hardware, the BIOS, the boot loader and the kernel is validated by calculating a respective checksum and comparing the respective checksum to a predetermined built-in value of the checksum.

17. The system according to claim 10, wherein the untrusted computing node is further configured to transmit a result of the computing function to a broker to be provided to the client device.

18. A system for providing a secure computing platform on an untrusted computing node, the system comprising:
   a broker configured to:
      receive a request generated by a client device to perform a computing function on a remote hardware node,
      select the untrusted computing node from a plurality of remote hardware nodes to performing the computing function, and
      transmit the request to the selected untrusted computing node to perform the computing function on the untrusted computing node,
   wherein in response to the received request, the untrusted computing node is configured to create an enclave in memory of the untrusted computing node; launch a virtual machine in the memory enclave; determine, whether data associated with the computing function is homomorphically encrypted; when the data associated with the computing function is homomorphically encrypted, put at least a portion of the data associated with the computing function outside of the enclave; and perform the computing function on the portion of the data which is outside of the memory enclave; and
   wherein a guest operating system in the virtual machine is configured to verify security of the untrusted computing node, and to perform the computing function on a portion of the data inside the memory enclave on the untrusted computing node upon the guest operating system verifying the security of the untrusted computing node.

19. The system according to claim 18,
   wherein the untrusted computing node is configured to register with the broker to offer use of the untrusted computing node, and
   wherein, upon registration by the untrusted computing node, the broker is configured to transmit to the untrusted computing node an operating system image that includes a hypervisor.

20. The system according to claim 19, wherein the hypervisor is further configured to relocate itself in the memory enclave after the hypervisor creates the memory enclave.

21. The system according to claim 18, wherein the guest operating system in the virtual machine is further configured to verify the security of the untrusted computing node by:
   obtaining a digital signature of a trusted boot module; and
   transmitting the digital signature of the trusted boot module to a third party authority that validates the digital signature and provides a response to the guest operating system.

22. The system according to claim 18, wherein a chain of trust is performed to verify that the virtual machine is running on a secure computing node and a trusted hypervisor, the chain of trust including:
   verifying, by a BIOS of the untrusted computing node, hardware of the untrusted computing node and then starting a boot loader;
   verifying, by the boot loader, the BIOS and then starting a kernel of the operating system;
   verifying, by the kernel, the boot loader, and then starting the hypervisor;
   verifying the kernel by the hypervisor running on the kernel, and then creating a virtual machine;
   verifying, the untrusted computing node by a guest operating system in the virtual machine.

23. The system according to claim 18, wherein the broker is further configured to receive a result of the computing function, from the untrusted computing node, and to provide the result of the computing function to the client device.

* * * * *